July 1, 1958

E. M. WILLIAMS 2,841,686

AUTOMATIC CONTROL SYSTEM FOR THE ELECTRODE
OF A SPARK-CUTTING APPARATUS

Filed Nov. 2, 1951

INVENTOR.
Everard M. Williams

BY

Webb, Mackey & Burden.

THEIR ATTORNEYS

July 1, 1958

E. M. WILLIAMS 2,841,686

AUTOMATIC CONTROL SYSTEM FOR THE ELECTRODE
OF A SPARK-CUTTING APPARATUS

Filed Nov. 2, 1951

INVENTOR.
Everard M. Williams

BY

THEIR ATTORNEYS

United States Patent Office 2,841,686
Patented July 1, 1958

2,841,686

AUTOMATIC CONTROL SYSTEM FOR THE ELECTRODE OF A SPARK-CUTTING APPARATUS

Everard M. Williams, Pittsburgh, Pa., assignor, by mesne assignments, to Firth Sterling Inc., Pittsburgh, Pa., a corporation of Pennsylvania Application November 2, 1951, Serial No. 254,566

10 Claims. (Cl. 219—69)

This invention relates to a system for regulating and feeding the electrode of an apparatus for cutting hard materials such as metal carbides by the repetitive spark method.

This application is a continuation-in-part of application Serial No. 237,736, filed July 20, 1951, now abandoned.

Teubner application Serial No. 169,438, now Patent No. 2,650,979, discloses a method and apparatus for cutting hard materials by the sparking resulting from the discharge of a condenser upon the breakdown of a dielectric medium in the gap between a workpiece and a tool in the form of an electrode adjacent thereto. In cutting by this method, the electrode is eroded to some extent, as well as the workpiece, and it is necessary therefore to readjust or feed the electrode forward at a very slow rate and occasionally to retract it in order to maintain proper conditions for continued sparking. Manual feeding of the electrode is not only tedious but uncertain since the gap between the electrode and the surface of the workpiece nearest thereto will ordinarily be difficult to observe and even with closest attention, the results are apt to be erratic. It is the object of the invention, accordingly, to provide automatic means effective not only to feed the electrode forward but to retract it should the normally open spark gap be bridged by an arc or by particles of material displaced from the workpiece. In other words, the invention constantly regulates the spark gap by movement of the electrode to insure optimum conditions, so that the cutting operation can proceed with highest efficiency and without interruption.

In a preferred embodiment of the invention, I employ a reversible motor for operating an electrode-actuating device and control the direction of rotation and the speed of the motor in accordance with the relative values of two parameters or functions of the circuits by which the condenser is successively charged and discharged. The difference between the values of the parameters determines the polarity and voltage of a generator connected to supply current to the motor. In turn, the polarity and voltage of the generator determine the direction and speed of rotation of the motor.

A complete understanding of the invention may be obtained from the following detailed description and explanation which refer to the accompanying drawings illustrating the preferred embodiment and several modifications thereof. In the drawings, Figure 1 is a circuit diagram showing schematically the various elements making up the system and the electrical connections therebetween;

Figure 1:
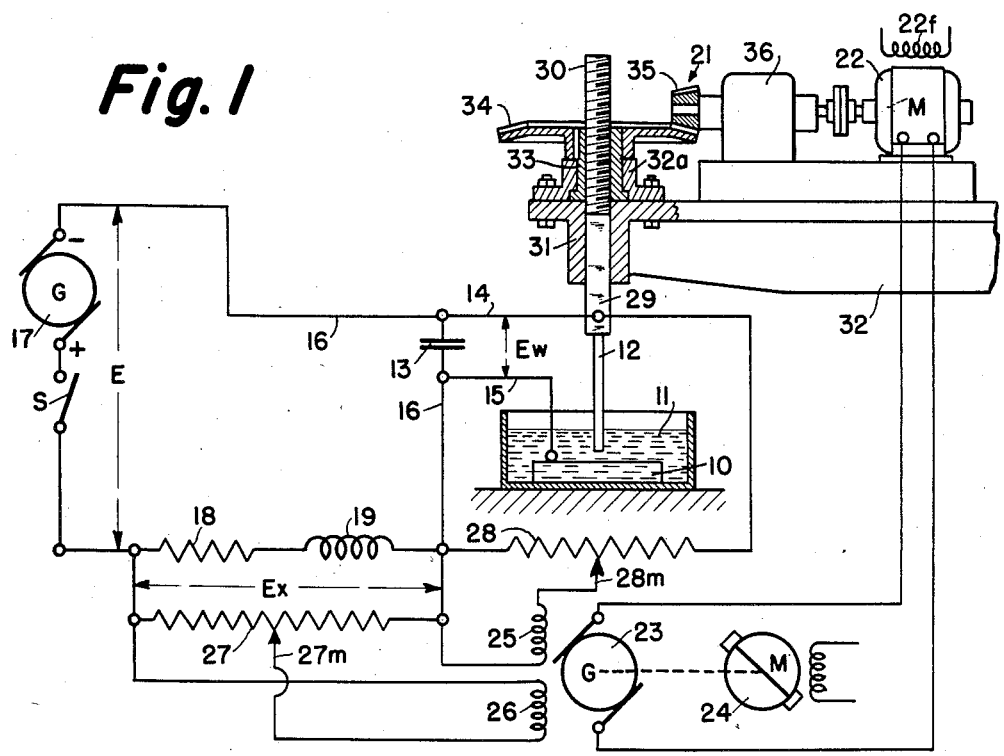

Referring now in detail to the drawings and for the present particularly to Figure 1, a workpiece 10 immersed in a bath 11 of dielectric liquid such as kerosene, is subjected to a controlled and concentrated erosion by the sparking occurring between it and an electrode 12 whereby the workpiece is eventually cut through or perforated along a predetermined line or at a given point. Sparking is caused when the charge on a condenser 13 is such as to create a difference of potential between the electrode and workpiece sufficient to break down or ionize the intervening medium. The discharge of the condenser (as is well known) is a transient, oscillatory phenomenon involving a current which initially rises to high peak values at the initial half-cycle pulse of each discharge but diminishes to zero within a few cycles which are completed within a fraction of a second, depending on the constants of the discharge circuit. This circuit includes conductors 14 and 15 extending from the condenser to the electrode and workpiece, respectively. A charging circuit 16 for the condenser comprises a direct-current source such as a generator 17, a control switch S and a suitable series impedance which may include a resistor 18 and an inductor 19. The values of the resistor and inductor are chosen to give the charging circuit the desired time constant. The negative terminal of the generator 17 is connected to the same terminal of the condenser as the electrode 12 and the positive generator terminal is connected through resistor 18 and inductor 19 to the same condenser terminal as the workpiece 10.

When switch S is closed, generator 17 will charge condenser 13 at a rate determined by the values of resistor 18 and inductor 19, until the potential difference between workpiece 10 and electrode 12 (the voltage across the condenser) is sufficient to break down the liquid insulation therebetween. Thereupon the condenser will quickly discharge by the passage of a transient current across the gap manifested by visible sparking and this current causes a slight erosion of the workpiece in the immediate neighborhood of the electrode. On completion of the discharge of the condenser, the latter is again charged by the generator and the process is repeated at a frequency determined by the various circuit constants.

The apparatus and circuits described so far are also disclosed and claimed in the copending applications referred to above. The invention relates to a control system for adjusting or regulating the position of the electrode 12 and feeding it forward to the workpiece as necessary to compensate for the progressive erosion which, as stated, affects not only the workpiece but also the electrode itself to some extent. I shall first describe the control circuits and then the electrode-actuating device proper. This device is indicated as a whole at 21 and is driven by a reversible motor 22. The motor may be a direct-current shunt motor. Its field 22f is connected to any convenient direct-current source and is continuously energized. The armature of motor 22 is connected directly to the armature terminals of a direct-current generator 23. The generator is driven at constant speed by any suitable means such as a motor 24 which may conveniently be a single-phase alternating-current motor of any desired type. With this power supply, it is evident that motor 22 will operate at a speed and in a direction determined by the polarity and value of the voltage across the generator terminals.

Generator 23 may be either an ordinary direct-current generator having two separate opposing field windings 25 and 26 arranged for independent excitation or a dynamo-electric amplifier such as is well known in the electrical industry as the "Amplidyne" or the "Rototrol." In the case of a dynamo-electric amplifier, the net magneto-motive force of the windings 25 and 26 serves simply as a pilot field to determine or "trigger" the polarity of the flux induced by a main field winding (not shown). In either case, the polarity and magnitude of the voltage developed by the generator are determined by the net M. M. F. or the differential between that of winding 25 and that of winding 26. In order to effect the desired regulation of the electrode position, I provide means for energizing winding 25 in accordance with one of the aforementioned parameters, i. e., the voltage across the spark gap between workpiece 10 and electrode 12. I arranged the generator and motor connections so that when the M. M. F. of winding 25 is dominant over that of winding 26, motor 22 will operate the electrode-actuating device to advance the electrode. We also provide means for energizing winding 26 in accordance with another of said parameters, i. e., the voltage across the impedance in the charging circuit. These energizing means may conveniently take the form of voltage dividers, or their equivalent.

A voltage divider 27 is connected across the impedance in the charging circuit, and winding 26 of generator 23 has one terminal connected to one end of the divider resistor and its other terminal connected to the movable contact 27m thereof. A similar divider 28 is connected across the gap between the workpiece 10 and electrode 12 and winding 25 has one terminal connected to one end of the resistor of this divider and its other terminal connected to the movable contact 28m thereof.

The electrode-actuating device 21 includes a chuck 29 in which electrode 12 is inserted and tightly held. The chuck is formed in the squared lower end of a screw shaft 30 which is vertically slidable but nonrotatable in a guide sleeve 31 mounted on a suitable support such as an arm 32 overhanging the workpiece 10. An interiorly threaded bushing or nut 33 is rotatable in a bearing 32a on top of sleeve 31 and shaft 30 is threaded therethrough. A bevel gear 34 rotatable on the bearing is secured to the nut for driving it to cause vertical movement of the shaft. The gear is driven by a bevel pinion 35 on the low speed shaft of a speed-reduction gear 36, the high-speed shaft of which is coupled to motor 22.

Figure 6:
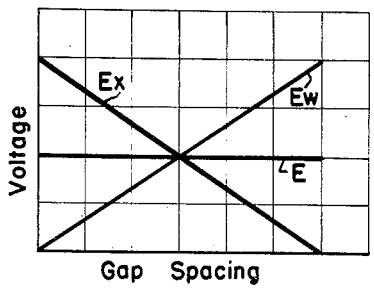
Figure 6 is a set of graphs of the several parameters.

Windings 25 and 26 are so related to the field of generator 23 and so connected relative to each other that when the M. M. F. of winding 25 exceeds that of winding 26, the polarity of the generator will be such that motor 22 will rotate in the direction which causes the electrode-actuating device 21 to advance the electrode toward the workpiece. Conversely, when the M. M. F. of winding 26 exceeds that of winding 25, motor 22 will rotate in the opposite direction causing device 21 to retract the electrode. That is, the speed and direction of motor 22 is given by the expression $S=K_0(I_{25}-I_{26})$, in which $K_0$ is a constant dependent on the characteristics of the generator and motor and $I_{25}$ and $I_{26}$ are the currents in winding 25 and 26, respectively. $I_{25}$ is proportional to the average voltage across the gap between the electrode and workpiece, $E_w$, which is the difference between the applied voltage E and the average voltage drop across impedance 18, 19 which may be called $E_x$. The relative values of $E_w$ and $E_x$ for various lengths of the gap between electrode and workpiece are shown in Figure 6. Applied voltage E is also there shown as a constant value. As shown, $E_w$ increases and $E_x$ decreases correspondingly with an increase in the gap spacing.

From the foregoing, $I_{25}=K_1(E-E_x)$, $K_1$ being adjustable by movement of contact 28m. Similarly $I_{26}$ is proportional to $E_x$ or $I_{26}=K_2E_x$, $K_2$ being adjustable by movement of contact 27m. Now the motor speed may be restated as $S=K_0[K_1(E-E_x)-K_2E_x]$. Thus, the effect of any inequality between $I_{25}$ and $I_{26}$ will be to cause the electrode to move in such direction as to eliminate the inequality or restore a balance. That is, if $I_{25}$ exceeds $I_{26}$, the electrode will be advanced rapidly toward the workpiece thereby reducing the gap and therefore the breakdown voltage so that $E_w$ is reduced and $E_x$ increased. This decreases $I_{25}$ and increases $I_{26}$. That is to say, the automatic control is effected by the relative values of the two parameters, $E_w$ and $E_x$, derived from the discharge and charging circuits, respectively.

The overall result is that the system approaches a stable condition in which $I_{25}$ is very nearly equal to $I_{26}$, the former exceeding the latter by only a sufficient margin to effect a steady forward drive of the electrode at a rate such as to compensate for electrode erosion. Any arc formation or clogging of the gap by material eroded from the electrode or workpiece causes a sharp increase in $I_{26}$ and a resulting reversal of the electrode until the arc is extinguished or the gap cleared. Since the normal speed of motor 22 is nearly zero, $K_1(E-E_x)=K_2E_x$ (substantially) and $$E_x = \frac{K_1 E}{K_1 + K_2}$$

The average gap voltage $E_w$ is $$E - E_x$$

or $$E_w = \frac{K_2 E}{K_2 + K_1} = K_3 E$$

in which $$K_3 = \frac{K_1}{K_1 + K_2}$$

The system provides an average gap voltage fixed by the settings of the contacts 27m and 28m according to this relationship on $K_3$. It will be clearly apparent, from the foregoing, that the invention provides a system in which a tendency to advance the electrode is balanced against a tendency to retract it so as to maintain a nearly constant voltage across the gap between the electrode and workpiece.

Figure 2:
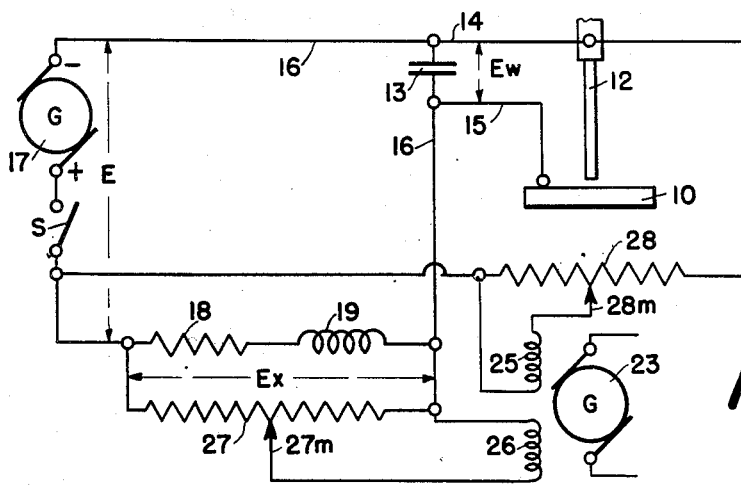
Figures 2 through 5 are partial diagrams of circuit modifications.

Figure 2 illustrates a modified control system which differs from that of Figure 1 only in that divider 28 is connected across the generator 17 instead of across the gap between workpiece 10 and electrode 12. Winding 25 is therefore energized in proportion to the constant voltage E, the third parameter, instead of the variable voltage $E_w$, and the control function is exercised by the differential between the M. M. F. of winding 25 excited by the constant voltage E and the M. M. F of winding 26 excited by the variable voltage $E_x$. It will be understood that generator 23 in the system of Figure 2 energizes motor 22 and that the latter drives the electrode-actuating mechanism although these elements are not repeated in Figure 2.

Figure 3:
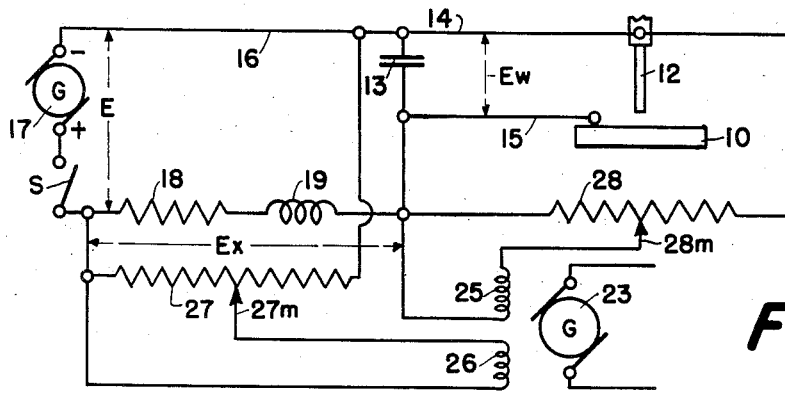

Figure 3 shows a further circuit modification in which divider 28 is connected across the gap between the electrode and workpiece, as in Figure 1, while divider 27 is connected across generator 17 as in Figure 2. Windings 25 and 26 are thus energized in proportion to the relative values of parameters $E_w$ and E and the difference between the resulting magnetomotive forces determines the polarity and voltage of generator 23.

Figure 4:
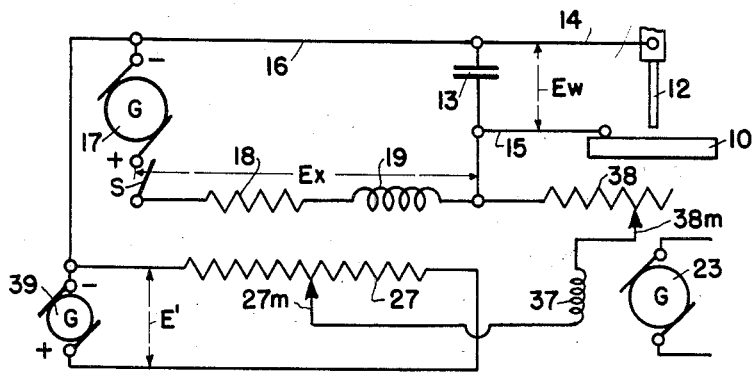

Figure 4 shows a still further modification in which the voltages proportional to the two parameters, instead of being applied to two windings, respectively, and the result determined by opposed magnetomotive forces, are applied in opposition to a single winding 37 so that the resulting M. M. F. is determined directly by the difference between voltages which, of course, controls the direction and magnitude of the current through winding 37. In Figure 4, one end of winding 37 is connected through a rheostat 38 to a point between the condenser 13 and inductor 19 and is thus subject to a positive voltage proportional to that across the impedance 18, 19. The other end of the winding 37 is connected to contact 27m of divider 27, the resistor of which is connected across a generator 39, and is thus subject to a constant positive voltage opposing that derived from the impedance. The direction and magnitude of current through the winding, as aforesaid, depends on the relative values of the two voltages used as parameters, i. e., $E_x$ and $E^1$, the latter being analogous to parameter E used in Figures 2 and 3.

Figure 5:
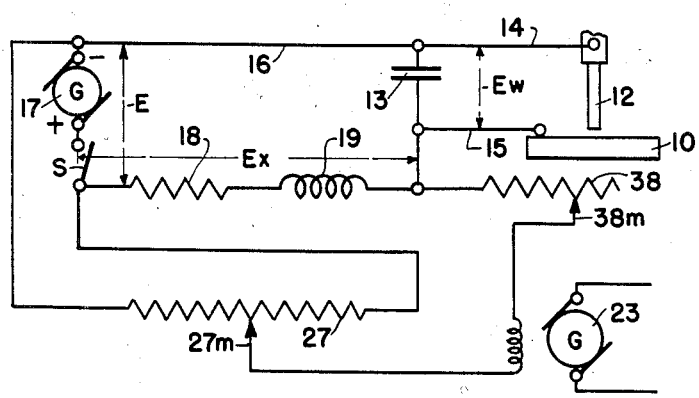

Figure 5 shows a slight modification of Figure 4 in which generator 39 is omitted and generator 17 is used to supply the constant voltage, merely by connecting the terminals of divider 27 to the latter.

The automatic electrode-control system of Figures 4 and 5 lends itself particularly well to a simple calibration which is useful in a production machine. Since a single control (divider contact 27m) regulates the average gap voltage to $K_1E$ once the supply voltage is chosen, the average gap voltage at which the cutting apparatus will operate is readily determined. It is thus possible to apply a simple calibration to contact 27m which permits setting the system to maintain any desired machining clearance between the electrode and workpiece which is within the range of the apparatus. Contact 38m is used for adjusting the stability of operation.

By way of brief summary, it may be noted that the invention may be practiced by using any two of the three parameters, $E_w$, the voltage across the gap, $E_x$, the voltage across the impedance and the constant voltage E of generator 17. The following tabulation gives the parameters involved in the several circuits shown in the drawings:

| Figure | | |
|---|---|---|
| Figure 1 | $E_w$ vs. $E_x$ | |
| Figure 2 | $E_x$ vs. E | Opposed magnetomotive forces. |
| Figure 3 | $E_w$ vs. E | |
| Figures 4 and 5 | $E_x$ vs. E, opposed voltages. | |

As will be apparent from the foregoing, the invention provides a simple yet effective apparatus for controlling the feed or adjustment of the electrode in a spark-cutting system. The control may be made highly accurate yet is flexible enough to be readily applicable to operating conditions normally to be expected. The several generators and motors employed are of small capacity so the overall cost of the system is not excessive.

Although there are illustrated several embodiments of the invention, it will be appreciated that it may be otherwise embodied within the terms of the appended claims.

I claim:

1. In a spark-cutting apparatus, energy storage means including a condenser, an electrode connected to one terminal thereof, adapted to approach a workpiece connected to the other terminal of the condenser and forming therewith a discharge circuit for the condenser, a current source and an impedance connected in series across said condenser forming a charging circuit therefor, means mounting the electrode for movement toward and from the workpiece, means interposing a dielectric fluid between the electrode and the workpiece, said condenser being effective when charged by said source to cause a spark discharge through the dielectric fluid between the electrode and workpiece when the gap separating them has been reduced to a predetermined value, the average voltage across the impedance, the average voltage across the gap and the voltage of a substantially constant-voltage source constituting three parameters of said circuit, a reversible motor driving said means, a generator supplying current to said motor and means determining the polarity and voltage of said generator in accordance with the difference between two of said parameters.

2. In a spark-cutting apparatus, an electrode adapted to approach a workpiece immersed in a dielectric medium, a condenser connected across the gap between the electrode and workpiece, and a direct-current source connected in series circuit with an impedance and said condenser to charge the latter, the combination therewith of means for actuating the electrode toward and from the workpiece, a reversible motor driving said means, a generator connected to said motor and means responsive jointly to two of the three voltages (a) across said gap, (b) across said impedance, and (c) a substantially constant voltage, effective to determine the polarity and voltage of said generator.

3. In a spark-cutting apparatus, energy storage means including a condenser, an electrode connected to one terminal thereof, adapted to approach a workpiece connected to the other terminal of the condenser and forming therewith a discharge circuit for the condenser, a current source and an impedance connected in series across said condenser forming a charging circuit therefor, means mounting the electrode for movement toward and from the workpiece, means interposing a dielectric fluid between the electrode and the workpiece, said condenser being effective when charged by said source to cause a spark discharge through the dielectric fluid between the electrode and workpiece when the gap separating them has been reduced to a predetermined value, the average voltage across the impedance, the average voltage across the gap and the voltage of a substantially constant-voltage source constituting three parameters of said circuit, a reversible motor driving said means, a field-excited generator supplying current to said motor, and means for exciting the generator field in proportion to the difference between the voltage across said impedance and the voltage across said gap to determine the polarity and amplitude of the generator output voltage.

4. In a spark-cutting apparatus, energy storage means including a condenser, an electrode connected to one terminal thereof, adapted to approach a workpiece connected to the other terminal of the condenser and forming therewith a discharge circuit for the condenser, a current source and an impedance connected in series across said condenser forming a charging circuit therefor, means mounting the electrode for movement toward and from the workpiece, means interposing a dielectric fluid between the electrode and the workpiece, said condenser being effective when charged by said source to cause a spark discharge through the dielectric fluid between the electrode and workpiece when the gap separating them has been reduced to a predetermined value, the average voltage across the impedance, the average voltage across the gap and the voltage of a substantially constant-voltage source constituting three parameters of said circuit, a reversible motor driving said means, a field-excited generator supplying current to said motor, and means for exciting the generator field in proportion to the difference between the voltage across said impedance and a constant voltage to determine the polarity and amplitude of the generator output voltage.

5. In a spark-cutting apparatus, energy storage means including a condenser, an electrode connected to one terminal thereof, adapted to approach a workpiece connected to the other terminal of the condenser and forming therewith a discharge circuit for the condenser, a current source and an impedance connected in series across said condenser forming a charging circuit therefor, means mounting the electrode for movement toward and from the workpiece, means interposing a dielectric fluid between the electrode and the workpiece, said condenser being effective when charged by said source to cause a spark discharge through the dielectric fluid between the electrode and workpiece when the gap separating them has been reduced to a predetermined value, the average voltage across the impedance, the average voltage across the gap and the voltage of a substantially constant-voltage source constituting three parameters of said circuit, a reversible motor driving said means, a field-excited generator supplying current to said motor, and means for exciting said generator field in proportion to the difference between the voltage across said gap and a constant voltage to determine the polarity and amplitude of the generator output voltage.

6. In spark cutting apparatus having an electrode spaced from a workpiece to form a gap therebetween: intermittent spark-providing circuitry therefor including a charging circuit comprising in series a direct-current source, an impedance, and a condenser; a discharging circuit connected across the condenser to receive a transient oscillatory discharge therefrom and connected across the gap between the electrode and workpiece to deliver the discharge thereto; means for moving the electrode toward and from the workpiece; and means responsive jointly to the average voltage across said gap and a voltage derived from the charging circuit to control the speed and direction of the first mentioned means.

7. In spark cutting apparatus having an electrode spaced from a workpiece immersed in an insulating medium to form a gap therebetween: intermittent spark-providing circuitry therefor including a charging circuit comprising in series a direct-current source, an impedance, and a condenser; a discharging circuit connected across the condenser to receive a transient oscillatory discharge therefrom and connected across the gap between the electrode and workpiece to deliver the discharge thereto; means for moving the electrode toward and from the workpiece; and means responsive jointly to a constant voltage derived from a circuit impressed directly across the direct-current source and a voltage derived from the charging circuit to control the speed and direction of the first mentioned means.

8. The method of automatically removing material from an electrically conductive workpiece comprising connecting an electrode cutter and an electrode workpiece in an oscillatory circuit, mounting at least one electrode so as to be capable of advancing toward and retracting from the other electrode, providing means for advancing and retracting at least the one electrode, providing an armature to bi-directionally drive said means, connecting a first electrical force and a second electrical force, through said armature, in polarity opposed relation such that when the voltage of said first force equals the voltage of said second force, no current passes through said armature to cause said armature to rotate, and, such that when the voltage of one of said forces is greater than the other, current passes through said armature to cause said armature to rotate in the direction of current flow; and when said forces are balanced said cutter is maintained properly proximate to said workpiece to give optimum material removal discharging therebetween.

9. In spark-cutting apparatus having an electrode spaced from a workpiece to define a dielectric fluid-filled spark gap therebetween, intermittent spark-providing circuitry including a condenser, a charging circuit for charging the condenser from a direct current source, a discharging circuit connected across the condenser including the electrode and workpiece defining said spark gap, a reversible motor means for moving the electrode relative to the workpiece to adjust the spark gap spacing as the machining proceeds, and means responsive to the difference between a reference direct current voltage and the average voltage across said gap to control the speed and direction of said motor means.

10. In an apparatus for dislodging particles from an electrically conductive workpiece by short-time spaced sparkover discharges across a dielectric fluid-filled spark gap defined between the workpiece and an electrode tool, a storage condenser, a charging circuit for charging the condenser from a voltage source, a discharge circuit including the spark gap for periodically discharging the capacitor, and feed means for advancing and retracting the electrode tool relative to the workpiece to adjust the gap spacing, said feed means including a reversible motive means responsive in speed and direction to the net amplitude and polarity of two opposing electrical signals, and means for deriving the signals from the voltage drop across the spark gap and a reference voltage to maintain the spark gap spacing as the workpiece particles are dislodged.

References Cited in the file of this patent

UNITED STATES PATENTS

| 1,989,546 | E. Chapman | Jan. 29, 1935 |
| 2,007,225 | Strobel | July 9, 1935 |
| 2,007,751 | V. J. Chapman | July 9, 1935 |
| 2,057,521 | Harding | Oct. 13, 1936 |
| 2,355,838 | Young et al. | Aug. 15, 1944 |
| 2,526,423 | Rudorff | Oct. 17, 1950 |
| 2,580,398 | Braswell | Jan. 1, 1952 |
| 2,588,744 | McKechnie | Mar. 11, 1952 |
| 2,592,894 | Harding | Apr. 15, 1952 |

FOREIGN PATENTS

| 257,468 | Switzerland | Apr. 1, 1949 |